US012692733B2

(12) United States Patent
Pittman

(10) Patent No.: US 12,692,733 B2
(45) Date of Patent: Jul. 28, 2026

(54) ROLL UP DOOR ASSEMBLY

(71) Applicant: Dynatect Manufacturing, Inc., New Berlin, WI (US)

(72) Inventor: Kyle J. Pittman, Knox, IN (US)

(73) Assignee: Dynatect Manufacturing, Inc., New Berlin, WI (US)

( * ) Notice: Subject to any disclaimer, the term of this patent is extended or adjusted under 35 U.S.C. 154(b) by 147 days.

(21) Appl. No.: 18/905,918

(22) Filed: Oct. 3, 2024

(65) Prior Publication Data

US 2026/0098434 A1 Apr. 9, 2026

Related U.S. Application Data

(60) Provisional application No. 63/606,466, filed on Dec. 5, 2023.

(51) Int. Cl.
E05B 83/10 (2014.01)
E05B 85/18 (2014.01)
(Continued)

(52) U.S. Cl.
CPC .............. E05B 83/10 (2013.01); E05B 85/18 (2013.01); *B60J 5/0497* (2013.01); *B60J 5/108* (2013.01);
(Continued)

(58) Field of Classification Search
CPC .......... E05B 63/24; E05B 77/32; E05B 83/10; E05B 85/18; E05B 65/0021; B05B 63/24;
(Continued)

(56) References Cited

U.S. PATENT DOCUMENTS 2,329,348 A * 9/1943 Honig ................. E05B 65/0021
                                                       292/125
3,352,585 A * 11/1967 Crosswell ........... E05B 65/0053
                                                       292/113
(Continued)

FOREIGN PATENT DOCUMENTS

WO     WO-2009014958 A1 * 1/2009 ........... E05D 15/165

OTHER PUBLICATIONS

Dynatect Manufacturing Inc.—https:/dynatect.com/product/doors-2/aluminum-roll-up-doors/—published at least as early as Sep. 27, 2023 at Dynatect.com.
(Continued)

*Primary Examiner* — Phi D A
(74) *Attorney, Agent, or Firm* — James A. Joyce; Godfrey & Kahn, S.C.

(57) ABSTRACT

A roll up door assembly is provided that includes a roller secured to both a roll up door and a roll up door frame, and a door handle assembly on the door having a pull strap block and a rear handle interconnected with a front handlebar via a plurality of lever arms. An end portion of a pull strap is secured to the rear handle, wherein the pull strap extends downward from the rear handle and wraps over a guide bottom surface of the pull strap block and then upwards through a gap to a grip portion of the pull strap, and wherein an upward force on the grip portion simultaneously provides both a downward force on the rear handle to actuate the front handlebar to disengage the handlebar from the frame, and to move the roll up door upwards towards an open position.

11 Claims, 11 Drawing Sheets

(51) Int. Cl.

| | |
|---|---|
| *B60J 5/04* | (2006.01) |
| *B60J 5/10* | (2006.01) |
| *E05B 63/24* | (2006.01) |
| *E06B 9/15* | (2006.01) |
| *E06B 9/17* | (2006.01) |

(52) U.S. Cl.
CPC ................. *E05B 63/24* (2013.01); *E06B 9/15* (2013.01); *E06B 9/17046* (2013.01)

(58) Field of Classification Search
CPC ...... B05B 77/32; B60J 5/10; B60J 5/12; B60J 5/0497; B60J 5/108; B60J 5/14; E06B 9/15; E06B 9/17046
See application file for complete search history.

(56) References Cited

U.S. PATENT DOCUMENTS

| | | | | |
|---|---|---|---|---|
| 3,625,544 A * | 12/1971 | Goodwin | ............... | B60J 5/0497 |
| | | | | 410/137 |
| 4,480,863 A * | 11/1984 | Hormann | ........... | E05B 65/0021 |
| | | | | 292/216 |
| 5,078,197 A * | 1/1992 | Weishar | .................... | E06B 9/13 |
| | | | | 160/133 |
| 5,718,466 A * | 2/1998 | Weinerman | ............... | E05C 9/22 |
| | | | | 384/909 |

| | | | | |
|---|---|---|---|---|
| 6,719,334 B1 * | 4/2004 | Curtis | ...................... | E05C 1/04 |
| | | | | 292/281 |
| 6,928,843 B1 * | 8/2005 | Pirnie | ................... | E05B 67/38 |
| | | | | 292/284 |
| 8,016,014 B2 * | 9/2011 | Crider | .................... | E06B 9/582 |
| | | | | 160/89 |
| 9,777,512 B2 * | 10/2017 | Curtis | ................. | E05B 63/0052 |
| 10,316,555 B2 * | 6/2019 | Stephens | ............. | E05B 65/0021 |
| 10,767,409 B2 * | 9/2020 | Ehrlich | ................... | B60J 10/84 |
| 12,024,927 B2 * | 7/2024 | Burns | ........................ | B60J 5/08 |
| 2003/0173040 A1 * | 9/2003 | Court | ........................ | E06B 9/58 |
| | | | | 160/264 |
| 2009/0025889 A1 * | 1/2009 | Crider | ...................... | E06B 9/40 |
| | | | | 160/192 |
| 2009/0236864 A1 * | 9/2009 | Ehrlich | .................... | E05B 9/08 |
| | | | | 292/217 |
| 2019/0178032 A1 * | 6/2019 | McNabb | ............. | E06B 9/17076 |

OTHER PUBLICATIONS

Dynatect Manufacturing Inc.—Gortite Roll-Up Doors.pdf—published at least as early as Sep. 27, 2023 at Dynatect.com.
Dynatect Manufacturing Inc.—Dynatect-RUD-Assembly_Detailed. pdf—published at least as early as Sep. 27, 2023 at Dynatect.com.
Dynatect Manufacturing Inc.—Dynatect-RUD-DeliveryVehicle. pdf—published at least as early as Nov. 1, 2021 at Dynatect.com.
Extended European Search Report for correspondence European Patent Application No. 24212208.3 dated May 12, 2025.

* cited by examiner

ROLL UP DOOR ASSEMBLY

CROSS-REFERENCE TO RELATED APPLICATION

This application claims priority to U.S. Provisional Patent Appl. No. 63/606,466 filed on Dec. 5, 2023. The disclosure of which is incorporated herein by reference.

FIELD OF THE INVENTION

The invention relates generally to roll up doors and more particularly to roll up door assemblies with handlebar release mechanisms.

BACKGROUND OF THE INVENTION

Roll up doors are commonly used to provide access to the side or rear of delivery vehicles. Such doors are secured to a frame and include a latching mechanism for latching the door when in a closed/down position. Typically, roll up doors are accessed/opened from the outside of the vehicle, but there are instances where the door needs to be opened from inside the vehicle.

BRIEF SUMMARY OF THE INVENTION

In at least some embodiments, the invention relates to a roll up door assembly that includes: a roll up door frame including a plurality of handlebar interlock brackets; a roller secured to the door frame; a roll up door comprising a plurality of slats and coupled to the roller and roll up door frame for selective movement of the roll up door between an open position and a closed position; and a door handle assembly having a top portion that is coupled to at least one of the plurality of slats, the door handle assembly including: an elongated panel having a front wall, a rear wall and a panel top portion; a panel bracket portion that extends outward from the front wall; a plurality of handle bracket hinges secured to the panel bracket portion; an elongated front handlebar coupled to the plurality of handle bracket hinges and including a pair of end portions configured to selectably engage the handlebar interlock brackets of the frame to secure the roll up door in a closed position; a rear handle interconnected with the front handlebar via a plurality of lever arms, the lever arms extending through slots in the panel; a pull strap having a grip portion and an end portion, wherein the end portion is secured to the rear handle; a pull strap block securable to the rear wall of the panel, wherein the pull strap block includes a pair of side walls; an offset center wall extending between side walls of the pull strap block, wherein the offset center wall includes a rear center wall surface that faces the rear wall to form a gap therebetween that receives and allows movement of the pull strap; and a guide portion extending between the side walls of the pull strap block and having a curved guide bottom surface, wherein the pull strap extends downward from the rear handle and wraps over the guide bottom surface, and then extends upwards through the gap towards the panel top portion, such that an upward force on the grip portion of the pull strap simultaneously provides both a downward force on the rear handle to actuate the front handlebar to disengage the end portions from the handlebar interlock brackets of the frame, and to move the roll up door upwards towards an open position.

In at least some other embodiments, the invention relates to a roll up door assembly that includes: a roll up door frame;

a roller secured to the door frame; a roll up door comprising a plurality of slats and coupled to the roller and roll up door frame for selective movement of the roll up door between an open position and a closed position; and a door handle assembly having a top portion that is coupled to at least one of the plurality of slats, the door handle assembly including: an elongated panel having a front wall, a rear wall and a panel top portion; a panel bracket portion that extends outward from the front wall; a plurality of handle bracket hinges secured to the panel bracket portion; an elongated front handlebar coupled to the plurality of handle bracket hinges and including a pair of end portions configured to selectably engage at least a portion of the frame to secure the roll up door in a closed position; a rear handle interconnected with the front handlebar via a plurality of lever arms, the lever arms extending through slots in the panel; a pull strap having a grip portion and an end portion, wherein the end portion is secured to the rear handle; a pull strap block securable to the rear wall of the panel, wherein the pull strap block includes a pair of side walls; an offset center wall extending between side walls of the pull strap block, wherein the offset center wall includes a rear center wall surface that faces the rear wall to form a gap therebetween that receives and allows movement of the pull strap; and a guide portion extending between the side walls of the pull strap block and having a curved guide bottom surface, wherein the pull strap extends downward from the rear handle and wraps over the guide bottom surface, and then extends upwards through the gap towards the panel top portion, such that an upward force on the grip portion of the pull strap simultaneously provides both a downward force on the rear handle to actuate the front handlebar to disengage the end portions from the handlebar interlock brackets of the frame, and to move the roll up door upwards towards an open position.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Figure 1:
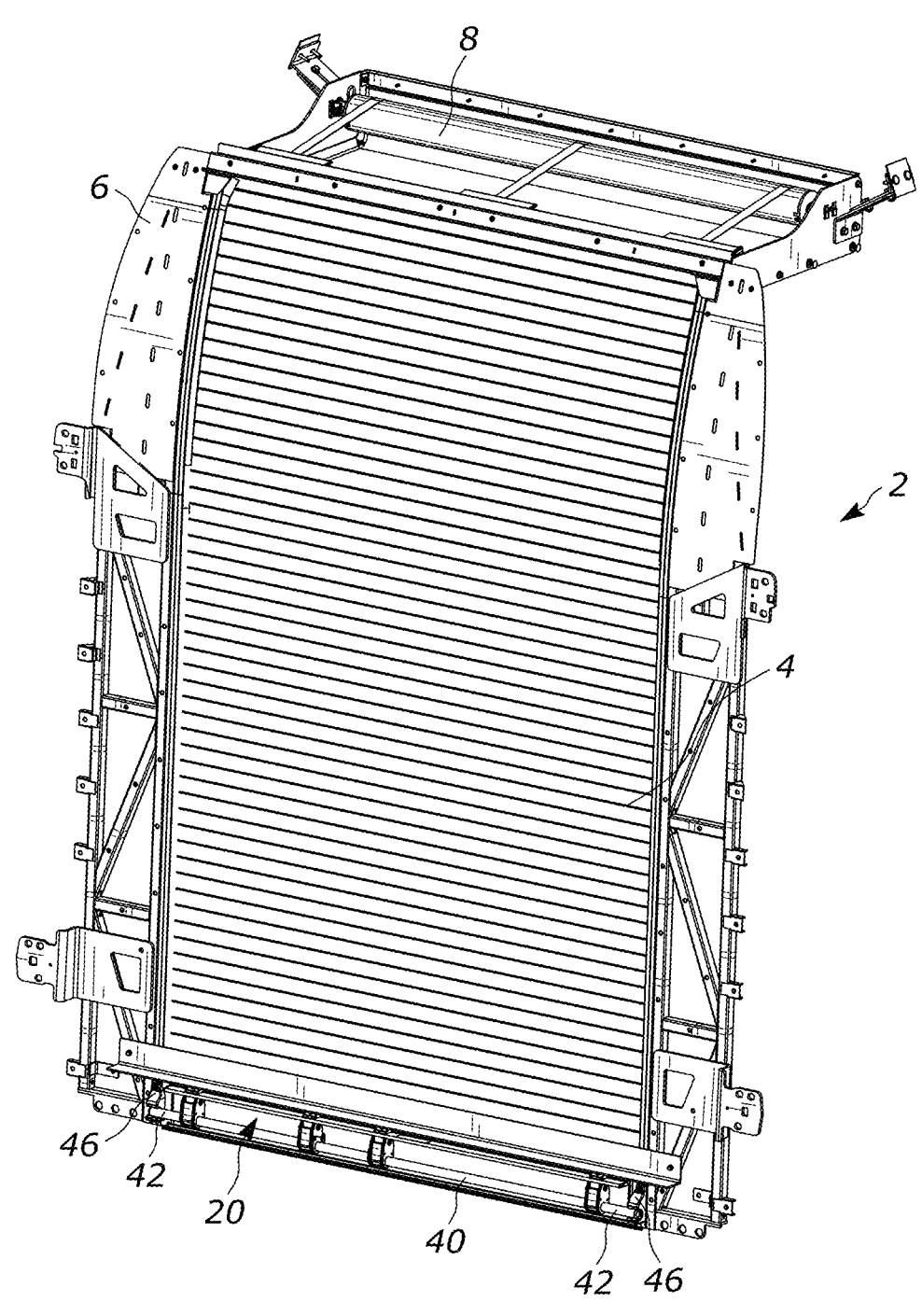
FIG. 1 is a front perspective of an exemplary embodiment of a roll up door assembly including a door, a frame, and a roller.
Figure 2:
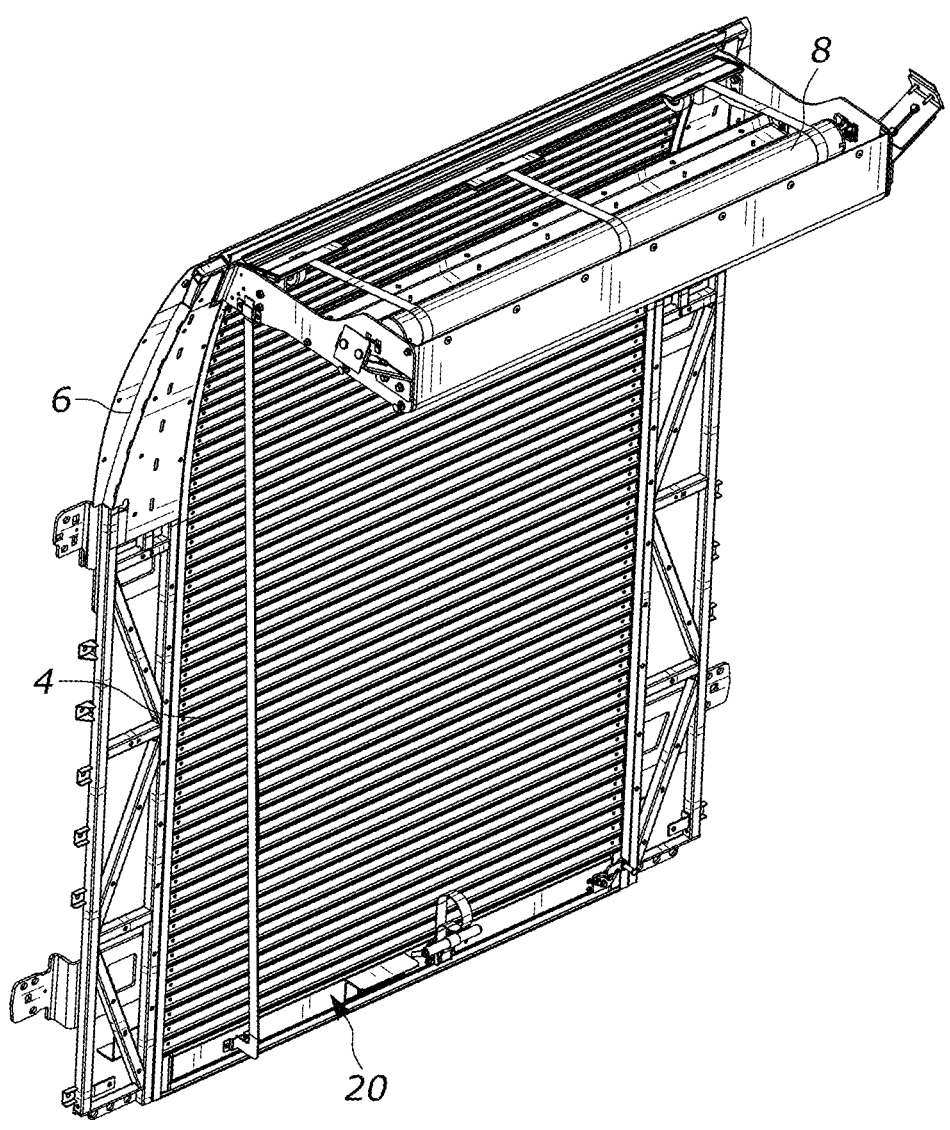
FIG. 2 is a rear perspective view of the roll up door assembly of FIG. 1.
Figure 3:
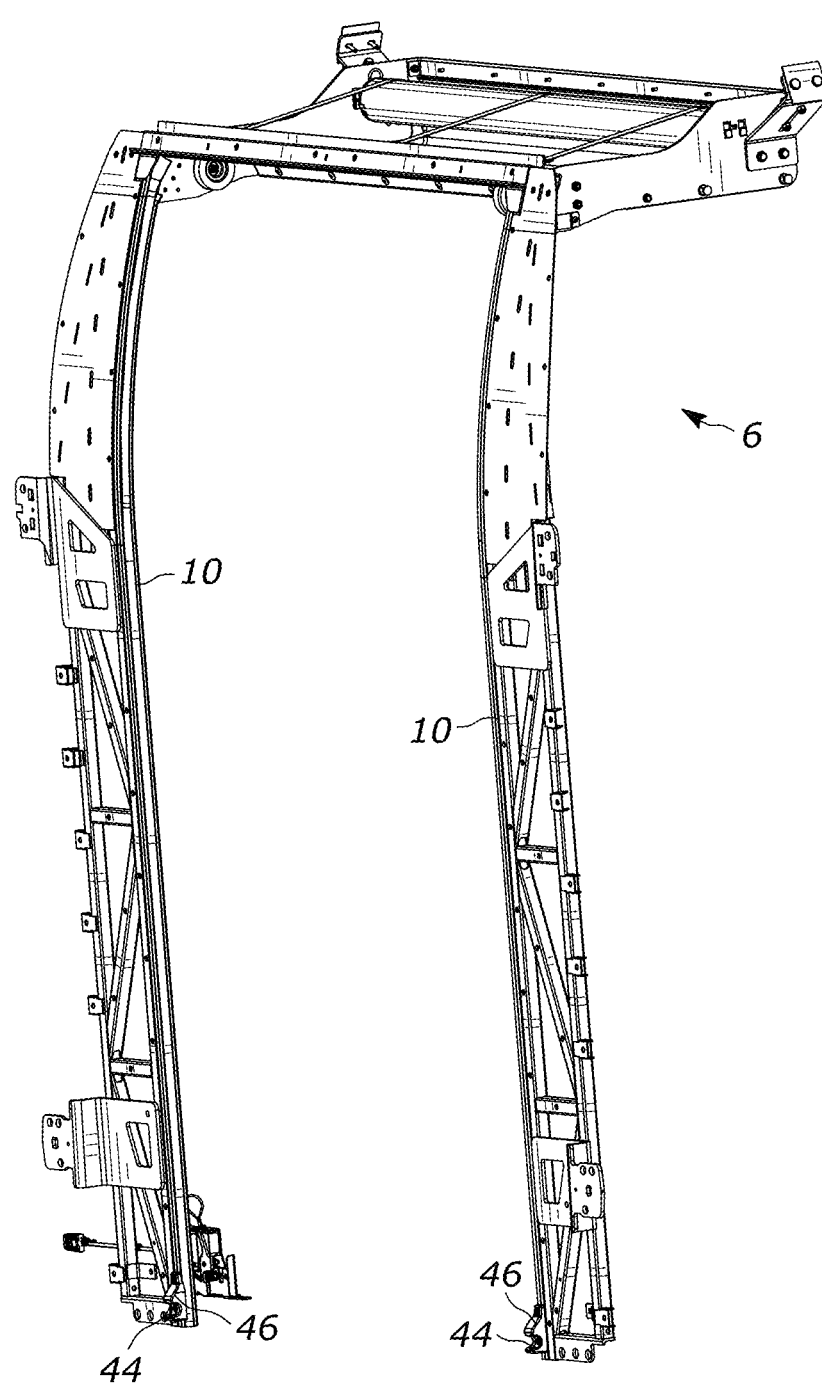
FIG. 3 is a front perspective view of the frame and roller of the roll up door assembly of FIG. 1.
Figure 4:
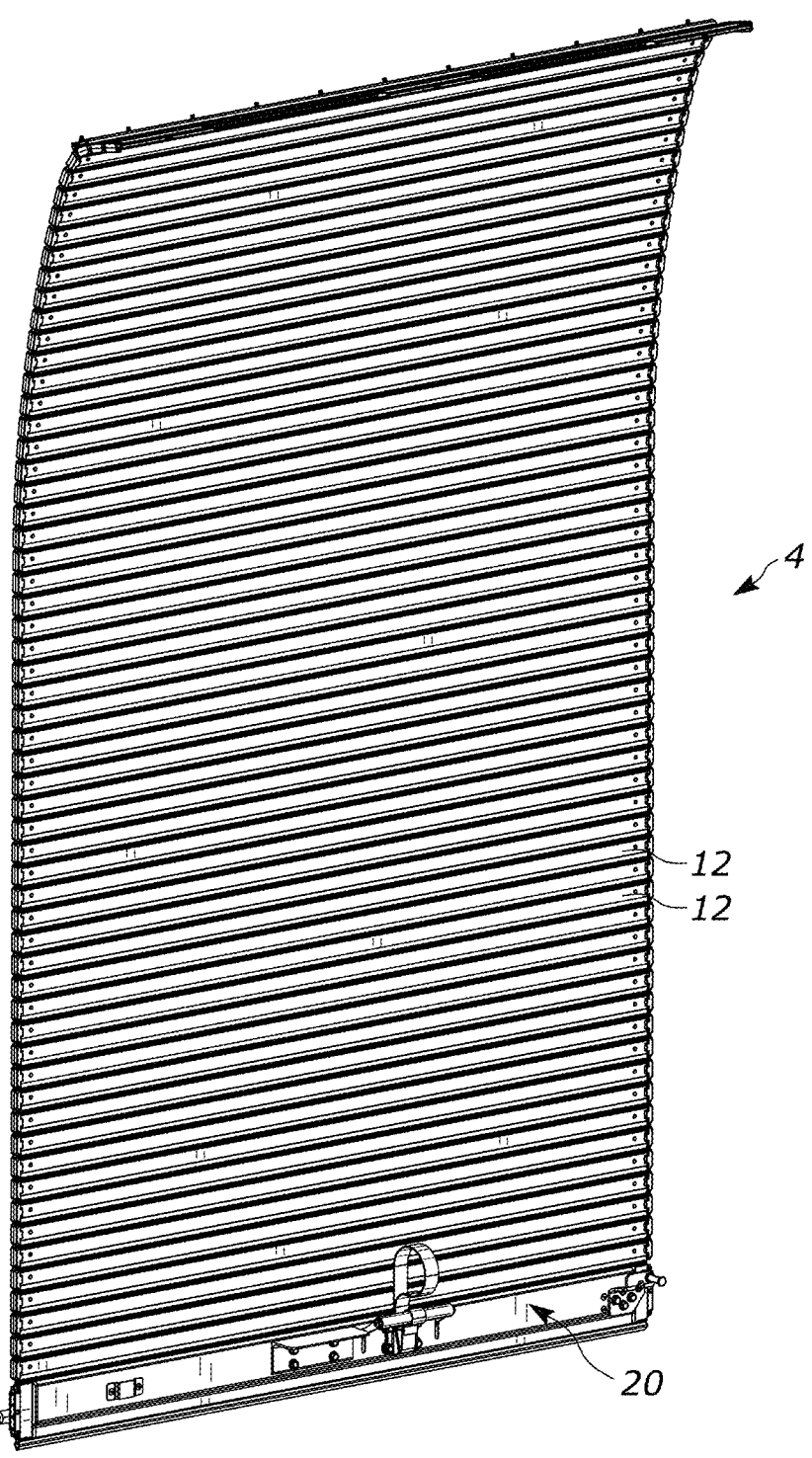
FIG. 4 is a front perspective view of the door of the roll up door assembly of FIG. 1.

Referring to FIGS. 1-4, an exemplary embodiment of a roll up door assembly 2 that includes a door 4, a frame 6, and a roller 8 is shown in various views. In at least some embodiments, the frame 6 and roller 8 are well known in the art and are generally used with a roll up style door, where the roller 8 is utilized to assist with raising and lowering the door between a pair side rails (i.e., tracks) 10 in the frame 6. The frame 6 is secured to an opening in a wall or panel of an enclosed space, such as a cargo truck, fire truck, etc. to selectably permit and prevent entry/access.

In at least some embodiments, the door 4 includes a plurality of horizontal slats 12 that are coupled together and secured to the roller 8 using know methods to allow the door 4 to roll up and down. Secured to the slats 12 at the bottom of the door 4 is a door handle assembly 20. The door handle assembly 20 is used to latch and unlatch the door 4 from the frame 6 to allow it to be selectably secured in a closed (i.e., down) position or raised to an open (i.e., up) position.

Figures 5, 6:
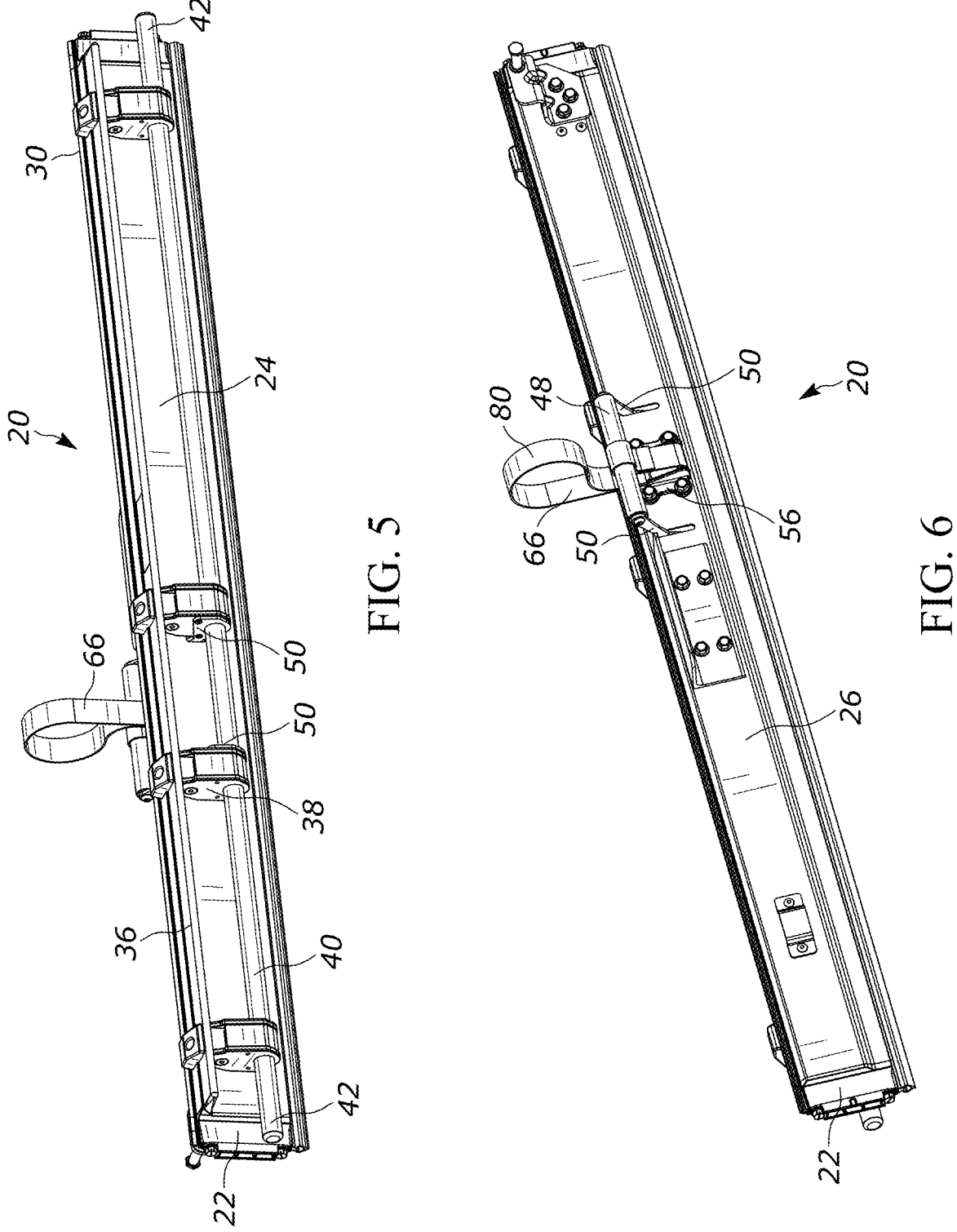
FIG. 5 is a front perspective view of a door handle assembly of the door of FIG. 4.
FIG. 6 is a rear perspective view of the door handle assembly of FIG. 5.
Figure 7:
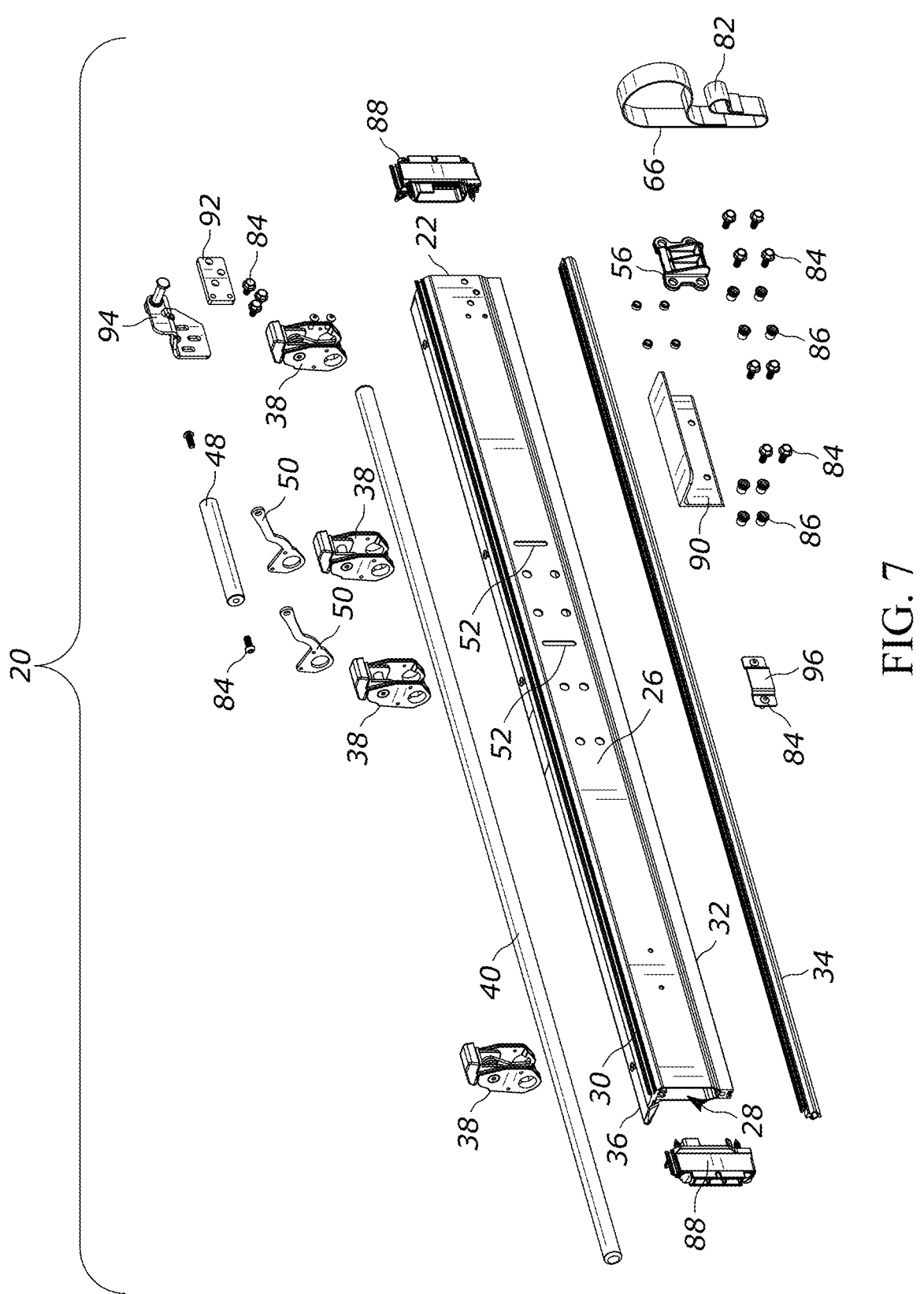
FIG. 7 is a rear perspective exploded view of the door handle assembly of FIG. 5.
Figure 8:
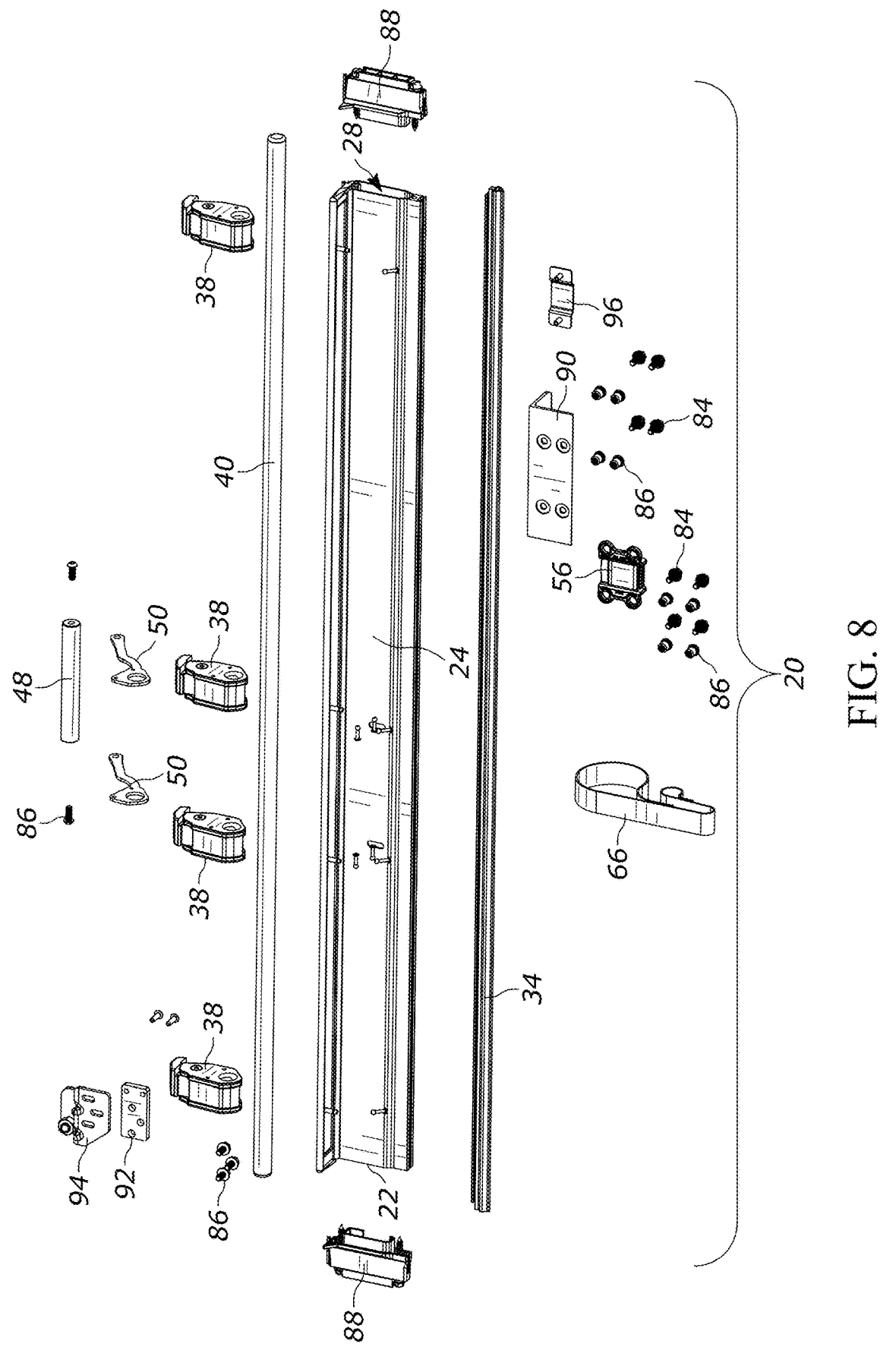
FIG. 8 is a front perspective exploded view of the door handle assembly of FIG. 5.
Figure 9:
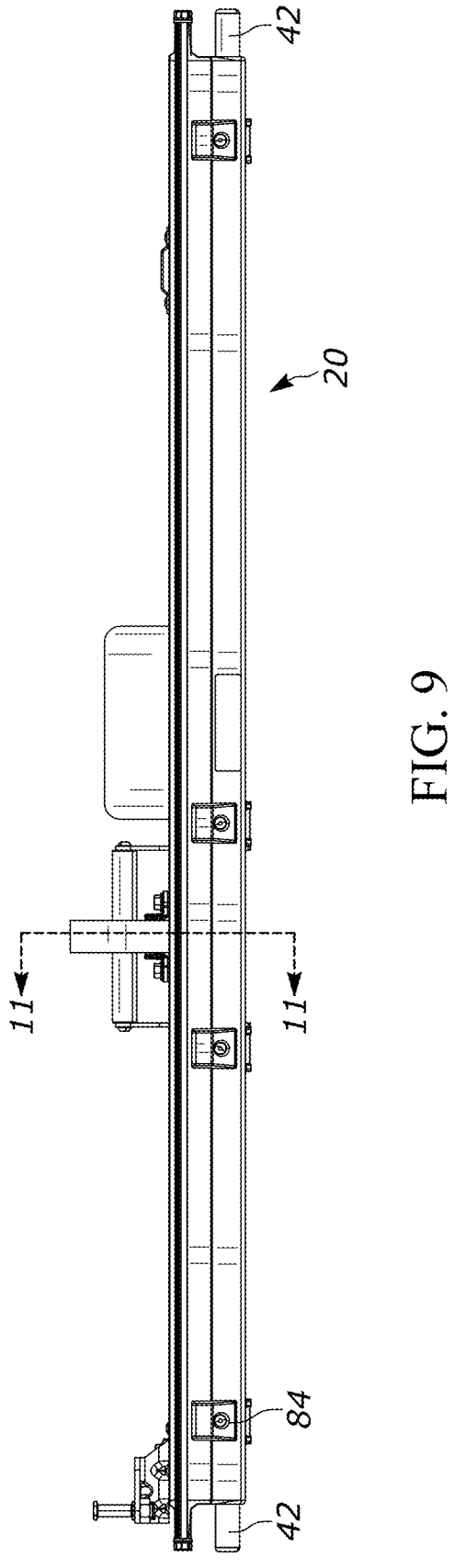
FIG. 9 is a top view of the door handle assembly of FIG. 5.
Figure 11:
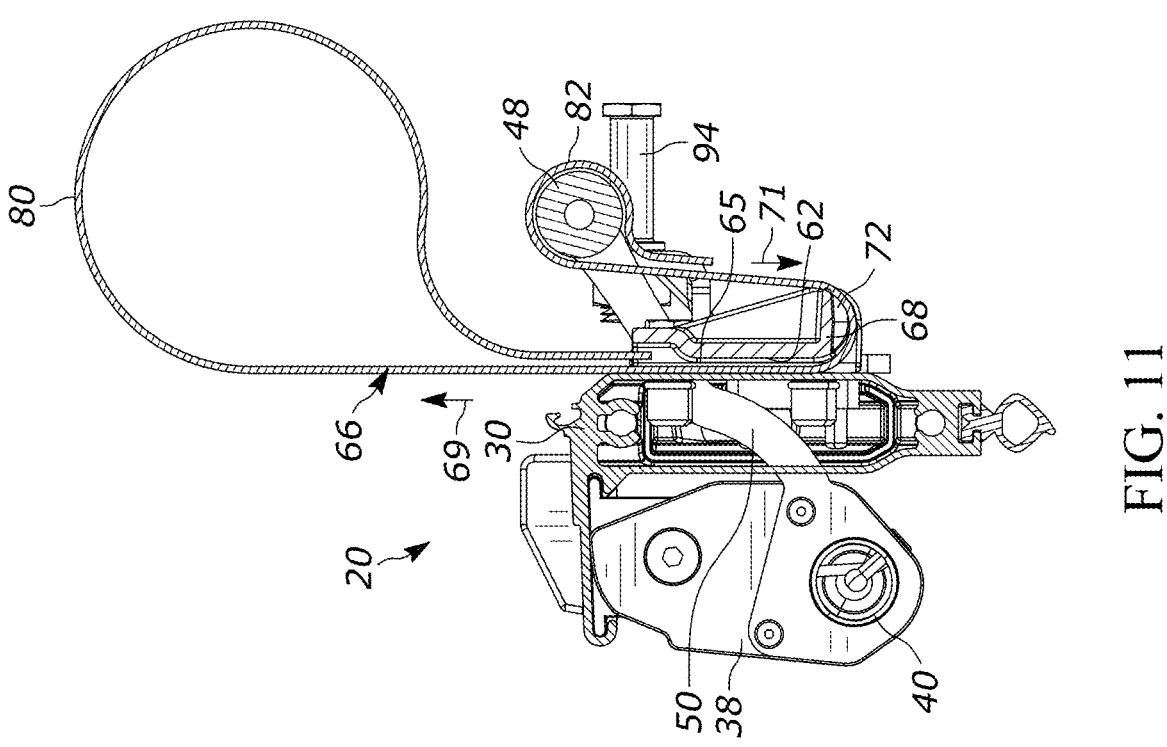
FIG. 11 is a cross-sectional view of the door handle assembly taken along line 11-11 of FIG. 9.
Figure 10:
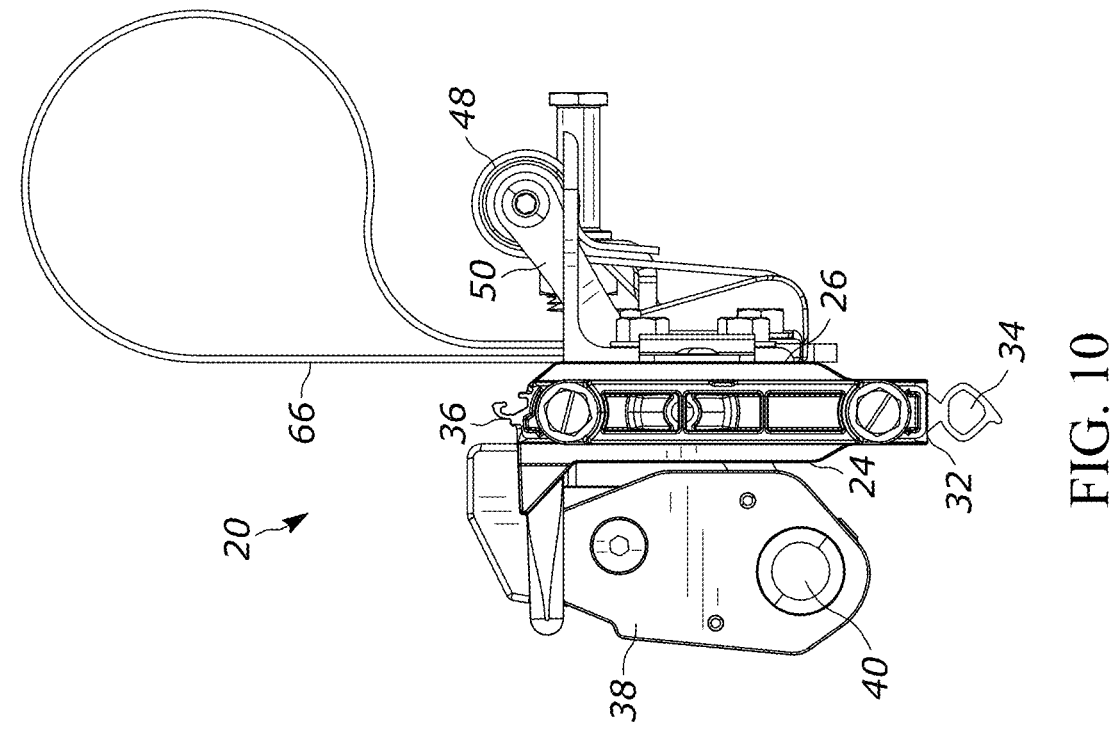
FIG. 10 is a first side view of the door handle assembly of FIG. 5.

Referring now to FIGS. 6-11, in at least some embodiments, the door handle assembly 20 includes an elongated panel 22. The panel 22 can take many forms, such as a hollow extruded component, where the length, thickness, height, etc. can vary to provide desired characteristics, such as increased strength, larger door sizes, etc. In at least some embodiments, the panel 22 includes a front wall 24 and a rear wall 26 either secured together or integrally formed and separated by a center cavity 28 therebetween. The panel 22 can further include a top portion 30 that is coupled to the lowest of the slats 12 of the door 4 using know methods such as interlocking/mating channels. The panel 22 can also include a bottom portion 32 for securing a bottom seal 34.

The panel 22 further includes a panel bracket portion 36 that extends outward from the front wall 24 (e.g., adjacent the top portion 30), wherein the panel bracket portion 36 can be integrally formed with the front wall 24 or secured thereto as a separate component. Secured to the panel bracket portion 36 is a plurality of handle bracket hinges 38 that couple an elongated front handlebar 40 to the panel bracket portion 36. The front handlebar 40 extends through the handle bracket hinges 38 and includes end portions 42 that are received within respective openings 44 in a pair of handlebar interlock brackets 46. The handlebar interlock brackets 46 receive the end portions 42 of the front handlebar 40 when the door 4 is in a closed position as the handlebar interlock brackets 46 provide a downward spring bias. The handlebar interlock brackets 46 shall not be limited to structures extending from the frame 6 as shown, but shall be understood to include any of various other structures or configurations that serve to provide a latching engagement surface for the end portions 42, such as cutouts in the frame 6, etc. The engagement of the end portions 42 within the openings 44 of the handlebar interlock brackets 46 prevents the door 4 from being raised/opened and secures the door 4 closed. To release the end portions 42 from the handlebar interlock brackets 46, the front handlebar 40 can be pulled outward (pivoting along the handle bracket hinges 38) until the end portions 42 clear the handlebar interlock brackets 46. The door 4 can then be lifted (i.e., opened) by further pulling outwards and upwards on the front handlebar 40 in one motion.

Another way to release the end portions 42 from the handlebar interlock brackets 46 is to use a rear handle 48. The rear handle 48 is interconnected with the front handlebar 40 via a plurality of lever arms 50 that are secured to both the front handlebar 40 and the rear handle 48. The lever arms 50 extend through the panel 22 via a pair of slots 52 (or another aperture in the panel 22). As the rear handle 48 and front handlebar 40 are interlocked, an operator applying downward force on the rear handle 48 causes the rear handle 48 to move downward and inward, and the front handlebar 40 to pivot outwards and upwards via the handle bracket hinges 38, causing disengagement of the end portions 42 from the handlebar interlock brackets 46. Typically, a door will include a fixed place strap secured to the door for an operator to pull up on while pushing the rear handle downward. While the interlock between the rear handle 48 and front handlebar 40 provide an easy to operate disengagement function, their use alone would require an operator on the rear side of the door 4 to provide both a downward force on the rear handle 48 and a simultaneous upward force on a strap. To resolve this need for simultaneous counterforces and improve ergonomics, the roll up door assembly 2 utilizes a pull strap block 56 secured to the door handle assembly 20.

Figure 12:
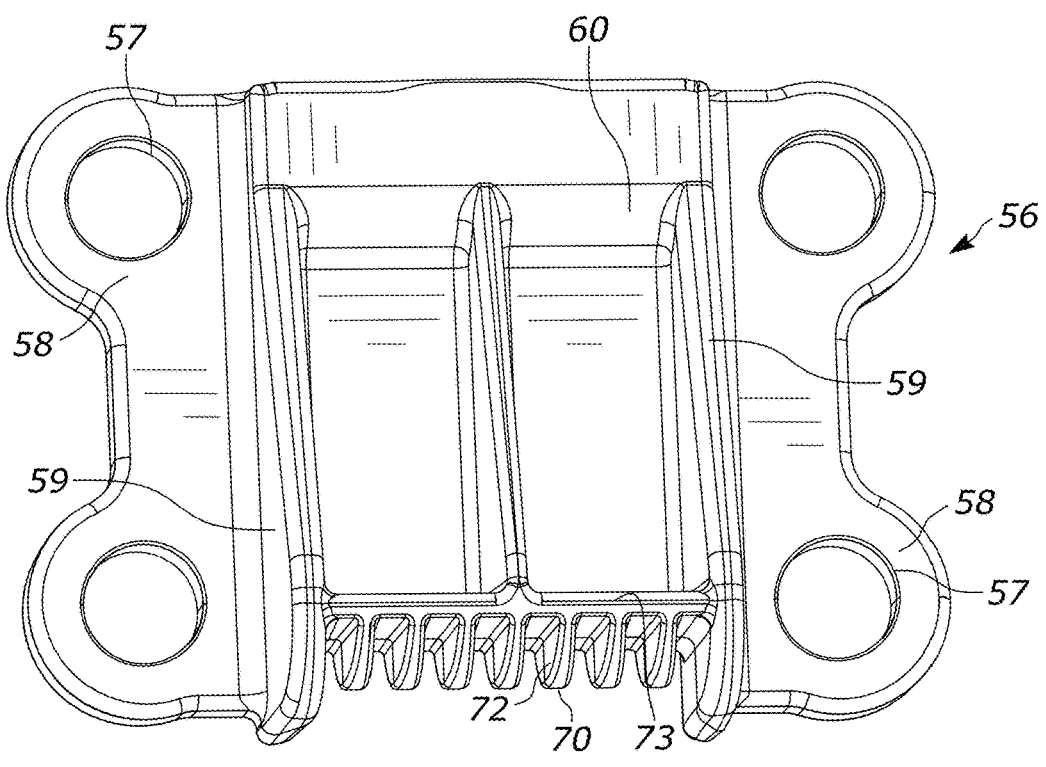
FIG. 12 is a first front perspective view of a pull strap block of the roll up door assembly of FIG. 1.
Figure 13:
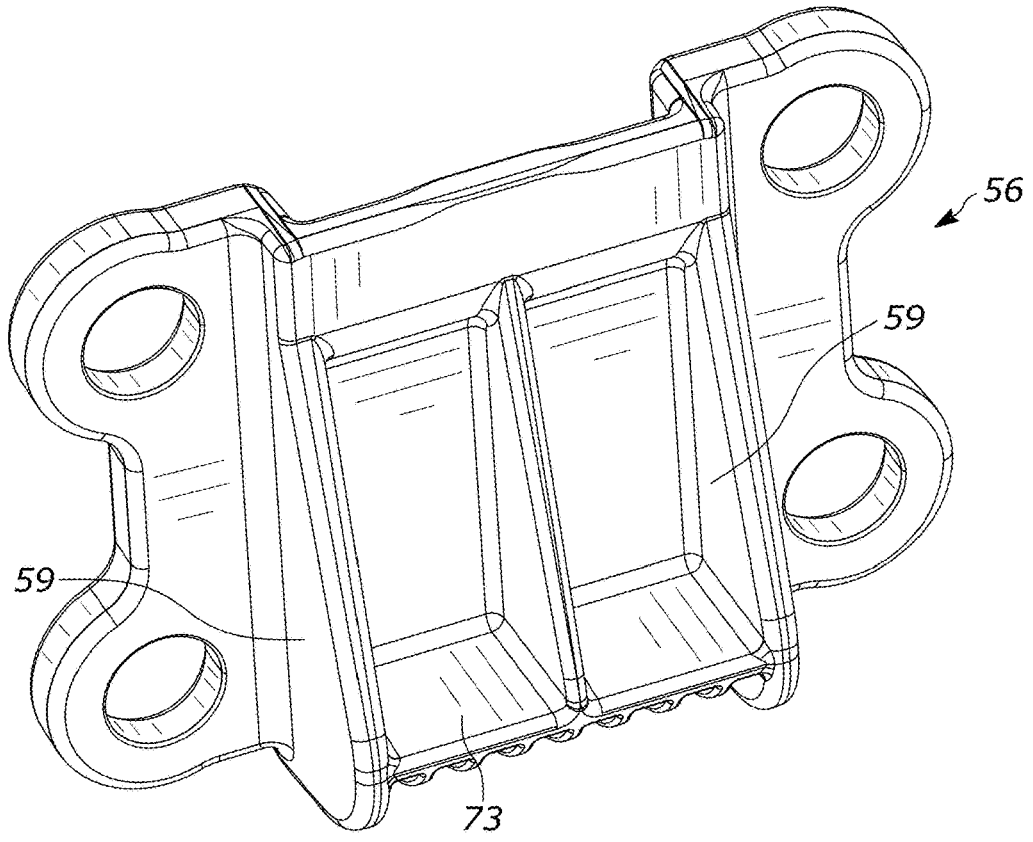
FIG. 13 is a second front perspective view of the pull strap block of FIG. 1.
Figure 14:
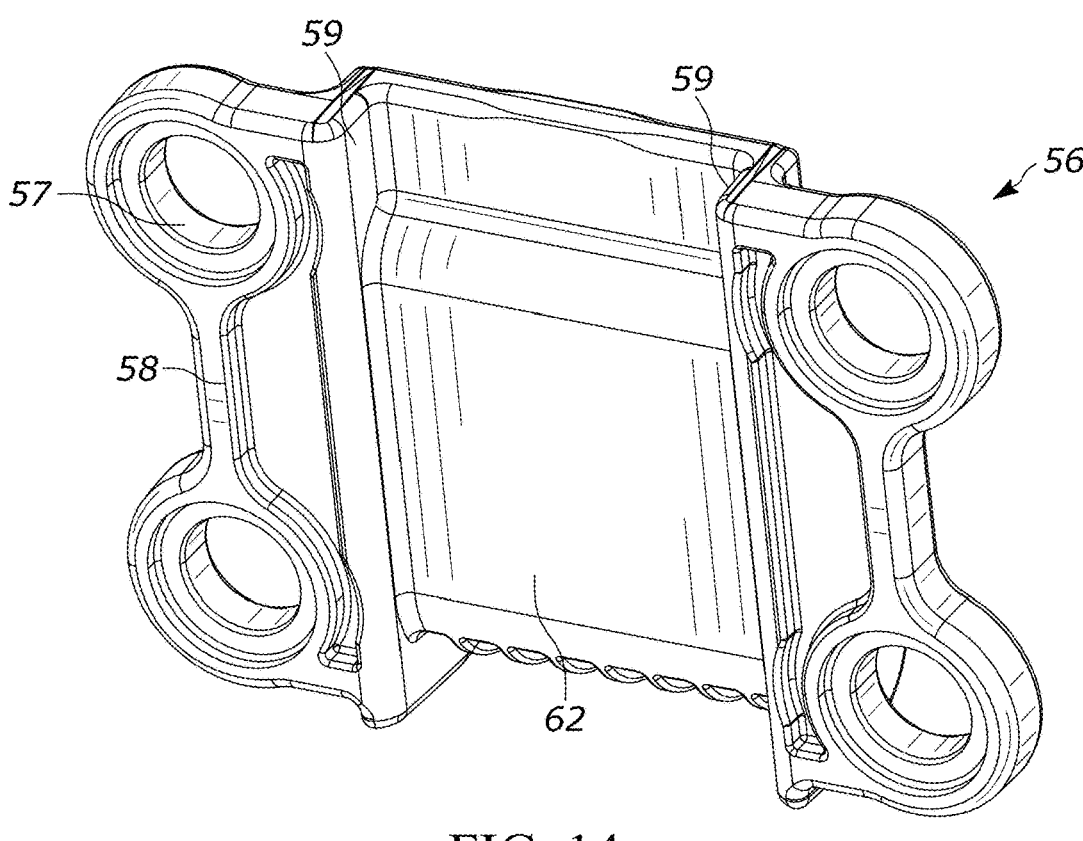
FIG. 14 is a first rear perspective view of the pull strap block of FIG. 1.
Figure 15:
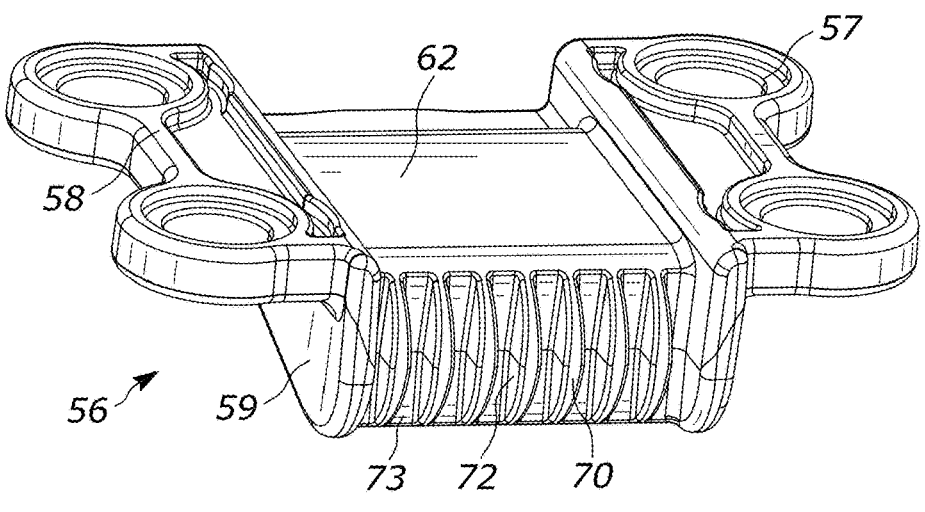
FIG. 15 is a second rear perspective view of the pull strap block of FIG. 1.

FIGS. 12-15 illustrate various perspective views of an exemplary embodiment of the pull strap block 56. As shown, in at least some embodiments, the pull strap block 56 includes a pair of outer flanges 58 that are securable to the rear wall 26 of the panel 22, such as through various bolt holes 57, where the flanges 58 may extend perpendicularly from a pair of side walls 59. A center wall 60 extends between side walls 59 and is offset by the outer flanges 58. The center wall 60 has a rear center wall surface 62 that can extend generally perpendicular to the side walls 59 and parallel with the rear wall 26 when secured thereto. When the pull strap block 56 is secured to the rear wall 26, the offset of the center wall 60 provides a gap 65 between the rear center wall surface 62 and the rear wall 26 that is suitable for a strap 66 to be movably positioned, while the side walls 59 can serve to maintain the strap 66 therebetween along the rear center wall surface 62. The pull strap block 56 further includes a guide portion 68 situated at the bottom of the center wall 60. The guide portion 68 can extend between the side walls 59 and is configured to change an upward movement (see arrow 69 in FIG. 11) of the strap 66 as it passes along one side of the pull strap block 56 (i.e. within the gap 65) into a downward movement (see arrow 71 in FIG. 11) of the strap 66 as it passes on the opposite side of the pull strap block 56. As such, in at least some embodiments the guide portion 68 includes a guide portion bottom surface 70, which can be curved to facilitate movement of the strap 66 thereover. Further, in at least some embodiments, the guide portion 68 includes a plurality of spaced curved ridges 72 that extend downward from a guide shelf 73 situated between the side walls 59, with the ridges 72 being generally parallel to each other and in combination form the guide portion bottom surface. In at least some embodiments, the side walls 59 extend downward past the ridges 72.

The strap 66 includes a grip portion 80 sized and shaped to be grasped by an operator (i.e., hand of user) and an end portion 82 that is secured to the rear handle 48. As such, when an operator applies an upward force to the grip portion 80 of the strap 66, the upward force is re-directed by the guide portion 68 to cause a downward force on the end portion 82 of the strap secured to the rear handle 48, thereby causing the rear handle 48 to move downward as the strap 66 moves across the guide portion 68 and along the gap 65 between the rear center wall surface 62 and the rear wall 26. The downward (and inward) movement of the rear handle 48 actuates the front handlebar 40 outward and upward (via the lever arms 50) to release/unlatch the door 4 from its latched position. In this manner, an operator can provide a single upward force to unlatch and lift the door 4 open, rather than a simultaneous downward force to unlatch the door 4 and a counter upward force to lift the door 4 open. As such, this configuration greatly improves the ergonomics of the roll up door assembly 2.

Various known fasteners (e.g., screws, rivets, welds, adhesives, etc.) can be utilized to secure components described herein, such as the screws 84 and nuts 86 seen in the figures. In addition, a pair of end caps 88 can be secured to the panel 22. Further, the door handle assembly 20 can include, an extended bracket 90 to assist an operator with opening or closing the door 4, a striker assembly 92 with a striker mounting plate 94, and/or a strap bracket 96.

Although the invention has been herein described in what is perceived to be the most practical and preferred embodiments, it is to be understood that the invention is not intended to be limited to the specific embodiments set forth above, but include modified forms of those embodiments including portions of the embodiments and combinations of elements of different embodiments as come within the scope of the following claims. Further, it is recognized that modifications may be made by one of skill in the art of the invention without departing from the spirit or intent of the invention and, therefore, the invention is to be taken as including all reasonable equivalents to the subject matter of the appended claims and the description of the invention herein. And, although certain advantages of different embodiments and disadvantages of certain prior art are described, no single claim must realize every or any benefit or overcome every or any disadvantage. The term "plurality" as used herein shall be understood to include one or more.

What is claimed is:

1. A roll up door assembly comprising:
a roll up door frame including a plurality of handlebar interlock brackets;
a roller secured to the door frame;
a roll up door comprising a plurality of slats and coupled to the roller and roll up door frame for selective movement of the roll up door between an open position and a closed position; and
a door handle assembly having a top portion that is coupled to at least one of the plurality of slats, the door handle assembly comprising:
an elongated panel having a front wall, a rear wall and a panel top portion;
a panel bracket portion that extends outward from the front wall;
a plurality of handle bracket hinges secured to the panel bracket portion;
an elongated front handlebar coupled to the plurality of handle bracket hinges and including a pair of end portions configured to selectably engage the handlebar interlock brackets of the frame to secure the roll up door in a closed position;
a rear handle interconnected with the front handlebar via a plurality of lever arms, the lever arms extending through slots in the panel;
a pull strap having a grip portion and an end portion, wherein the end portion is secured to the rear handle;
a pull strap block securable to the rear wall of the panel, wherein the pull strap block includes a pair of side walls;
an offset center wall extending between the side walls wherein the offset center wall includes a rear center wall surface that faces the rear wall to form a gap therebetween that receives and allows movement of the pull strap; and
a guide portion extending between the side walls and having a curved guide bottom surface, wherein the pull strap extends downward from the rear handle and wraps over the guide bottom surface, and then extends upwards through the gap towards the panel top portion, such that an upward force on the grip portion of the pull strap simultaneously provides both a downward force on the rear handle to actuate the front handlebar to disengage the end portions from the handlebar interlock brackets of the frame, and to move the roll up door upwards towards an open position.

2. The roll up door assembly of claim 1, further comprising a pair of outer flanges extending perpendicularly from respective side walls of the pull strap block.

3. The roll up door assembly of claim 2, wherein the rear center wall surface extends perpendicular to the side walls and parallel with the rear wall of the plate when secured thereto.

4. The roll up door assembly of claim 1, wherein the guide portion includes a plurality of spaced curved ridges that extend downward from a guide shelf situated between the side walls.

5. The roll up door assembly of claim 4, wherein the plurality of spaced curved ridges are generally parallel to each other.

6. The roll up door assembly of claim 4, wherein the plurality of spaced curved ridges in combination form the guide bottom surface for receiving the pull strap thereover.

7. A roll up door assembly comprising:
a roll up door frame;
a roller secured to the door frame;
a roll up door comprising a plurality of slats and coupled to the roller and roll up door frame for selective movement of the roll up door between an open position and a closed position; and
a door handle assembly having a top portion that is coupled to at least one of the plurality of slats, the door handle assembly comprising:
an elongated panel having a front wall, a rear wall and a panel top portion;
a panel bracket portion that extends outward from the front wall;
a plurality of handle bracket hinges secured to the panel bracket portion;
an elongated front handlebar coupled to the plurality of handle bracket hinges and including a pair of end portions configured to selectably engage the frame to secure the roll up door in a closed position;
a rear handle interconnected with the front handlebar via a plurality of lever arms, the lever arms extending through slots in the panel;

a pull strap having a grip portion and an end portion, wherein the end portion is secured to the rear handle;

a pull strap block secured to the rear wall of the panel, wherein the pull strap block includes a pair of side walls;

an offset center wall extending between the side walls wherein the offset center wall includes a rear center wall surface that faces the rear wall to form a gap therebetween that receives and allows movement of the pull strap; and a guide portion extending between the side walls and having a curved guide bottom surface, wherein the pull strap extends downward from the rear handle and wraps over the guide bottom surface, and then extends upwards through the gap towards the panel top portion, such that an upward force on the grip portion of the pull strap simultaneously provides both a downward force on the rear handle to actuate the front handlebar to disengage the end portions from the frame, and to move the roll up door upwards towards an open position.

8. The roll up door assembly of claim 7, further comprising a pair of outer flanges extending perpendicularly from respective side walls of the pull strap block.

9. The roll up door assembly of claim 8, wherein the rear center wall surface extends perpendicular to the side walls and parallel with the rear wall of the plate when secured thereto.

10. The roll up door assembly of claim 8, wherein the guide portion includes a plurality of spaced curved ridges that extend downward from a guide shelf situated between the side walls.

11. The roll up door assembly of claim 10, wherein the plurality of spaced curved ridges are generally parallel to each other and in combination form the guide bottom surface for receiving the pull strap thereover.

* * * * *